US012306709B2

United States Patent
Kim et al.

(10) Patent No.: US 12,306,709 B2
(45) Date of Patent: May 20, 2025

(54) METHOD AND APPARATUS FOR STORING BLOCKCHAIN DATA BASED ON ERROR CORRECTION CODE

(71) Applicant: ELECTRONICS AND TELECOMMUNICATIONS RESEARCH INSTITUTE, Daejeon (KR)

(72) Inventors: Chang-Soo Kim, Daejeon (KR); Myung-Cheol Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/489,333

(22) Filed: Oct. 18, 2023

(65) Prior Publication Data

US 2024/0134739 A1 Apr. 25, 2024
US 2024/0232002 A9 Jul. 11, 2024

(30) Foreign Application Priority Data

Oct. 21, 2022 (KR) .................. 10-2022-0136483
Aug. 9, 2023 (KR) .................. 10-2023-0104187

(51) Int. Cl.
*G06F 11/08* (2006.01)
(52) U.S. Cl.
CPC .................. *G06F 11/085* (2013.01)
(58) Field of Classification Search
CPC .. G06F 11/085; H04L 67/1097; H04L 1/0046; H04L 1/0061; H04L 9/50
USPC ........................................................ 714/752
See application file for complete search history.

(56) References Cited

U.S. PATENT DOCUMENTS

| | | | | |
|---|---|---|---|---|
| 10,769,135 | B1* | 9/2020 | Zhuo | G06F 16/2246 |
| 10,824,601 | B1* | 11/2020 | Zhuo | H04L 9/50 |
| 10,833,846 | B1* | 11/2020 | Zhuo | G06F 11/1044 |
| 10,911,220 | B1* | 2/2021 | Zhuo | H04L 9/0637 |
| 11,030,044 | B2 | 6/2021 | Zhuo et al. | |
| 11,057,190 | B2 | 7/2021 | Lu et al. | |
| 11,233,654 | B2 | 1/2022 | Zhuo et al. | |
| 11,307,927 | B2 | 4/2022 | Zhuo | |
| 11,327,833 | B2 | 5/2022 | Lu et al. | |
| 11,640,376 | B2 | 5/2023 | Heo et al. | |

(Continued)

FOREIGN PATENT DOCUMENTS

| | | |
|---|---|---|
| KR | 20200047412 A | 5/2020 |
| KR | 10-2020-0112236 A | 10/2020 |

(Continued)

OTHER PUBLICATIONS

Xiaodong Qi et al., "BFT-Store: Storage Partition for Permissioned Blockchain via Erasure Coding", 2020 IEEE 36th International Conference on Data Engineering (ICDE), pp. 1926-1929, Apr. 2020.

*Primary Examiner* — Albert Decady
*Assistant Examiner* — Osman M Alshack
(74) *Attorney, Agent, or Firm* — Rabin & Berdo, P.C.

(57) ABSTRACT

Disclosed herein are a method and an apparatus for storing blockchain data based on error correction code. The method for storing blockchain data based on error correction code includes dividing block data to be stored into multiple subblock datasets, generating parity datasets corresponding to the block data, and storing the subblock datasets and the parity datasets in proportion to storage capacities of the blockchain data storage nodes.

19 Claims, 9 Drawing Sheets

(56) References Cited

U.S. PATENT DOCUMENTS

| | | | |
|---|---|---|---|
| 2020/0241961 A1* | 7/2020 | Zhuo | .................... H04L 9/3247 |
| 2020/0301894 A1 | 9/2020 | Heo et al. | |
| 2020/0336297 A1* | 10/2020 | Zhuo | ................. G06F 16/2379 |
| 2021/0044422 A1* | 2/2021 | Lu | ......................... H04L 9/3239 |
| 2021/0049065 A1* | 2/2021 | Lu | ......................... H04L 9/3236 |
| 2021/0049066 A1* | 2/2021 | Lu | ......................... H04L 9/3239 |
| 2021/0073075 A1* | 3/2021 | Zhuo | .................... G06F 11/182 |
| 2021/0119805 A1* | 4/2021 | Zhuo | .................... H04L 9/3239 |
| 2022/0004318 A1 | 1/2022 | Mullick et al. | |

FOREIGN PATENT DOCUMENTS

| | | |
|---|---|---|
| KR | 10-2021-0045353 A | 4/2021 |
| KR | 10-2021-0058744 A | 5/2021 |
| KR | 10-2021-0058746 A | 5/2021 |
| KR | 10-2363271 B1 | 2/2022 |
| KR | 10-2396737 B1 | 5/2022 |

\* cited by examiner

| BLOCK NUMBER RANGE (E.G.: 101-200) | |
|---|---|
| K VALUE (E.G.: 3) | M VALUE (E.G.: 2) |
| ORDERED NODE LIST (E.G.: NODE1, NODE2, NODE3, NODE4, NODE5) | |

METHOD AND APPARATUS FOR STORING BLOCKCHAIN DATA BASED ON ERROR CORRECTION CODE

CROSS REFERENCE TO RELATED APPLICATIONS

This application claims the benefit of Korean Patent Application Nos. 10-2022-0136483, filed Oct. 21, 2022 and 10-2023-0104187, filed Aug. 9, 2023, which are hereby incorporated by reference in their entireties into this application.

BACKGROUND OF THE INVENTION

1. Technical Field

The present disclosure relates to technology for storing blockchain data based on error correction code in which the storage space of nodes participating in a blockchain network is taken into consideration.

2. Description of the Related Art

A distributed ledger system referred to as a blockchain network a consensus network allows data of multiple untrusted participants to be securely and immutably stored. Blockchain networks may include public blockchain networks, private blockchain networks, and consortium blockchain networks. A distributed ledger can store transaction data, status data, and other types of data.

Some blockchain networks duplicatively store a distributed ledger in respective nodes participating in the corresponding blockchain networks. The size of the distributed ledger may greatly increase as transactions continuously occur. Because this requires a lot of computing power and storage space, a problem may arise in that a normal-level system cannot store and process blockchain data. Consequently, a problem of counteracting decentralization arises as only nodes having high computing power and storage capacity become capable of participating as full nodes which perform complete functions.

Some blockchain networks employ a method for distributing and storing ledger data in participant nodes by utilizing erasure code which is a type of error correction code (ECC), instead of duplicatively storing ledger data in participant nodes.

The erasure code divides original data into k units, and adds m parity bits to the k units to generate (encode) n (=k+m) datasets. When, among the n datasets, arbitrary k datasets are given, the original data may be recovered. That is, even though arbitrary m datasets among the n datasets are lost, recovery of the original data is possible. The blockchain network distributes and stores the n datasets in the blockchain nodes one by one. The erasure code-based blockchain network may save a considerable storage space. However, a problem may arise in that respective nodes participating in the blockchain network may be provided with different storage spaces, and a node having a relatively small space among the nodes cannot participate in the blockchain network from a certain time point due to a continuously increasing ledger size.

Therefore, in consideration of the storage spaces of the nodes participating in the blockchain network, it is better to distribute and store blockchain data. Further, there is a need to be able to solve the problem caused by Byzantine nodes (i.e., inaccessible nodes due to the faults or nodes exhibiting abnormal behavior by malicious users) that may occur in the blockchain network.

PRIOR ART DOCUMENTS

Patent Documents (Patent Document 1) Korean Patent Application Publication No. 2020-0112236 (Title: Method and Apparatus for Managing Decentralized Identifier).

SUMMARY OF THE INVENTION

Accordingly, the present disclosure has been made keeping in mind the above problems occurring in the prior art, and an object of the present disclosure is to provide a distributed storage method in which the storage spaces of blockchain participant nodes are taken into consideration.

Another object of the present disclosure is to guarantee Byzantine fault tolerance and reduce storage spaces by storing blockchain data based on error correction coding.

In accordance with an aspect of the present disclosure to accomplish the above objects, there is provided a method for storing blockchain data based on error correction code, the method being performed by multiple blockchain data storage nodes, the method including dividing block data to be stored into multiple subblock datasets; generating parity datasets corresponding to the block data; and storing the subblock datasets and the parity datasets in proportion to storage capacities of the blockchain data storage nodes.

Storing the subblock datasets and the parity datasets in proportion to the storage capacities may include storing hash values corresponding to the subblock datasets or the parity datasets in an additional blockchain data storage node in which the subblock datasets or the parity datasets are not stored.

Each of the blockchain data storage nodes may have a maximum number of datasets at which the subblock datasets and the parity datasets are capable of being stored.

The maximum number of datasets may be determined based on a ratio of allowable Byzantine nodes to normal nodes.

The number of parity datasets may be determined based on an allowable number of Byzantine nodes and a ratio of allowable Byzantine nodes to normal nodes.

The method may further include, when a new blockchain data storage node is added, re-encoding existing blockchain data and storing re-encoded blockchain data in the new blockchain data storage node.

Re-encoding and storing may include adjusting the number of parity datasets and the number of subblock datasets in conformity with a changed number of blockchain data storage nodes.

Re-encoding and storing may further include relocating the parity datasets and the subblock datasets when a new blockchain data storage node is added and adjustment of the number of parity datasets and the number of subblock datasets is not required.

The method may further include storing the adjusted number of parity datasets and the adjusted number of subblock datasets in a preset data structure.

Storing the subblock datasets and the parity datasets in proportion to the storage capacities may be performed using a probability distribution-based random integer generation function that generates an integer in proportion to the storage capacities of the blockchain data storage nodes.

A sum of the number of subblock datasets and the number of parity datasets may correspond to R*(f+1), where R denotes a ratio of allowable Byzantine nodes to normal nodes, and f denotes a number of allowable Byzantine nodes.

The method may further include, when a certain blockchain data storage node withdraws, comparing a code rate after withdrawal of the certain blockchain data storage node with a code rate before withdrawal of the certain blockchain data storage node.

Comparing the code rate may include not performing re-encoding when the code rate after the withdrawal is equal to or greater than the code rate before the withdrawal.

The block data to be stored may correspond to multiple pieces of block group data.

In accordance with another aspect of the present disclosure to accomplish the above objects, there is provided an apparatus for storing blockchain data based on error correction code, including one or more processors; and execution memory configured to store at least one program that is executed by the one or more processors, wherein the at least one program includes instructions for performing dividing block data to be stored into multiple subblock datasets; generating parity datasets corresponding to the block data; and storing the subblock datasets and the parity datasets in proportion to storage capacities of the blockchain data storage nodes.

Storing the subblock datasets and the parity datasets in proportion to the storage capacities may include storing hash values corresponding to the subblock datasets or the parity datasets in an additional blockchain data storage node in which the subblock datasets or the parity datasets are not stored.

Each of the blockchain data storage nodes may have a maximum number of datasets at which the subblock datasets and the parity datasets are capable of being stored.

The maximum number of datasets may be determined based on a ratio of allowable Byzantine nodes to normal nodes.

The number of parity datasets may be determined based on an allowable number of Byzantine nodes and a ratio of allowable Byzantine nodes to normal nodes.

When a new blockchain data storage node is added, the program may further include an instruction for performing re-encoding existing blockchain data and storing re-encoded blockchain data in the new blockchain data storage node.

Re-encoding and storing may include adjusting the number of parity datasets and the number of subblock datasets in conformity with a changed number of blockchain data storage nodes.

Re-encoding and storing may further include relocating the parity datasets and the subblock datasets when a new blockchain data storage node is added and adjustment of the number of parity datasets and the number of subblock datasets is not required.

The program may further include an instruction for performing storing the adjusted number of parity datasets and the adjusted number of subblock datasets in a preset data structure.

Storing the subblock datasets and the parity datasets in proportion to the storage capacities may be performed using a probability distribution-based random integer generation function that generates an integer in proportion to the storage capacities of the blockchain data storage nodes.

A sum of the number of subblock datasets and the number of parity datasets may correspond to R*(f+1), where R denotes a ratio of allowable Byzantine nodes to normal nodes, and f denotes a number of allowable Byzantine nodes.

The program may further include an instruction for performing, when a certain blockchain data storage node withdraws, comparing a code rate after withdrawal of the certain blockchain data storage node with a code rate before withdrawal of the certain blockchain data storage node.

Comparing the code rate may include not performing re-encoding when the code rate after the withdrawal is equal to or greater than the code rate before the withdrawal.

The block data to be stored may correspond to multiple pieces of block group data.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
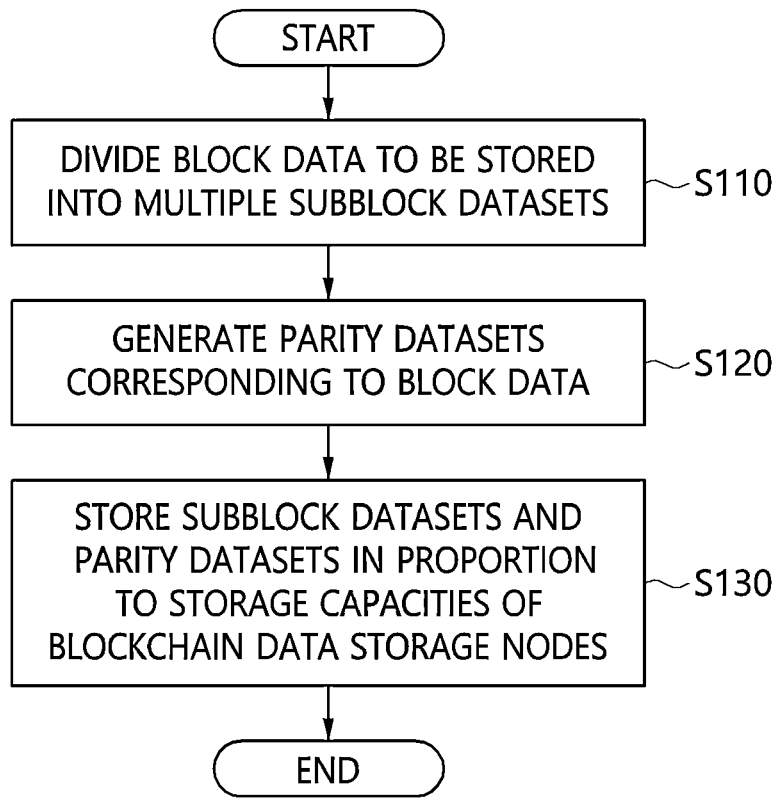
FIG. 1 is a flowchart illustrating a method for storing blockchain data based on error correction code according to an embodiment of the present disclosure.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, embodiments of the present disclosure will be described in detail with reference to the accompanying drawings. In the following description of the present disclosure, the same reference numerals are used to designate the same or similar elements throughout the drawings and repeated descriptions of the same components will be omitted.

The present disclosure relates to a method and apparatus for storing ledger data in a blockchain network. The ledger data may include block data that is a set of pieces of transaction data, status data, and other types of data. Hereinafter, block data will be described as an example for description. The present disclosure is not limited to the block data, and the block data may be selectively combined with the status data and other types of ledger data.

Generally, blockchain networks may include public blockchain networks, private blockchain networks, and consortium blockchain networks. Embodiments of the present specification will be described with reference to the consortium blockchain networks. However, the embodiments of the present specification may be implemented on any suitable type of blockchain network.

Such a blockchain network uses a consensus protocol to achieve a consensus (e.g., a consensus or agreement on addition of a new block). The consensus protocol includes various types, and includes Practical Byzantine Fault Tolerance (PBFT) as the consensus protocol chiefly utilized in the consortium blockchain network. A Byzantine Fault Tolerance (BFT) system guarantees the normal operation of the system when the number of Byzantine nodes (i.e., inaccessible nodes due to the faults or nodes exhibiting abnormal behavior by malicious users) is less than or equal to f.

When the total number of nodes participating in a distributed environment is n, the maximum allowable number of Byzantine nodes f in the PBFT protocol is $int((n-1)/3)$.

That is, when $n>=3f+1$, a normal operation is guaranteed. As other types of protocols, Zilliqa supports $f=int((n-1)/4)$ and Ripple supports $f=int((n-1)/5)$. The embodiments of the present specification will be described in detail with reference to PBFT. However, the embodiments of the present specification may be applied to an arbitrary consensus protocol.

The present disclosure describes technologies for processing and storing blockchain ledger data based on error correction code (ECC). ECC is technology for adding redundant bits having a specific mathematical structure to data and then recovering original data through the redundant bits even when it is impossible to access part of the data. Output encoded through ECC may or may not represent the original data without change. Error Correction Codes (ECCs) by which the original data appears on the output without change are referred to as 'systematic codes', and other codes are referred to as 'non-systematic codes'.

As one example of the error correction code, there may be erasure code. By utilizing erasure coding, k symbol messages may be encoded into a codeword having n symbols. Here, k and n are natural numbers, where k<n. A message may be recovered from subsets (a minimum of k subsets) out of the codeword having n symbols. The code rate of the erasure code may be $r=k/n$.

The embodiments described in the present disclosure may include one or more characteristics alone or in a selective combination thereof.

FIG. 1 is a flowchart illustrating a method for storing blockchain data based on error correction code according to an embodiment of the present disclosure.

The method for storing blockchain data based on error correction code according to the embodiment of the present disclosure may be performed in a system including storage devices for storing blockchain data based on error correction code.

Referring to FIG. 1, the method for storing blockchain data based on error correction code according to the embodiment of the present disclosure may include step S110 of dividing block data to be stored into multiple subblock datasets, step S120 of generating parity datasets corresponding to the block data, and step S130 of storing the subblock datasets and the parity datasets in proportion to the storage capacities of blockchain data storage nodes.

Here, step S130 of storing the subblock datasets and the parity datasets in proportion to the storage capacities of the blockchain data storage nodes may store hash values corresponding to the subblock datasets or the parity datasets in other blockchain data storage nodes in which the subblock datasets or the parity datasets are not stored.

Here, the blockchain data storage nodes may have a maximum number of datasets at which the subblock datasets and the parity datasets can be stored.

Here, the maximum number of datasets may be determined based on the ratio of allowable Byzantine nodes to normal nodes.

Here, the number of parity datasets may be determined based on the allowable number of Byzantine nodes and the ratio of allowable Byzantine nodes to the normal nodes.

Further, the number of parity datasets may be determined based on the maximum number of datasets and the allowable number of Byzantine nodes.

In this case, although not illustrated in FIG. 1, the method may further include the step of, when a new blockchain data storage node is added, re-encoding existing blockchain data and storing the re-encoded blockchain data in the new blockchain data storage node.

Here, the re-encoding and storing step may include the step of adjusting the number of parity datasets and the number of subblock datasets in conformity with the changed number of blockchain data storage nodes.

Here, the re-encoding and storing step may include the step of relocating the parity datasets and the subblock datasets when a new blockchain data storage node is added and there is no need to adjust the number of parity datasets and the number of subblock datasets.

Here, although not illustrated in FIG. 1, the method may further include the step of storing adjusted number of parity datasets and the adjusted number of subblock datasets in a preset data structure.

Here, the step of storing the subblock datasets and the parity datasets in proportion to the storage capacities may be performed using a probability distribution-based random integer generation function that is generated to correspond to the storage capacities of the blockchain data storage nodes.

Here, the sum of the number of subblock datasets and the number of parity datasets may correspond to R*(f+1), where R may denote the ratio of allowable Byzantine nodes to the normal nodes, and f may be the allowable number of Byzantine nodes.

Here, the method may further include the step of, when a blockchain data storage node withdraws from the blockchain network, comparing a code rate after the withdrawal of the corresponding blockchain data storage node with a code rate before the withdrawal of the corresponding blockchain data storage node.

Here, at the step of comparing the code rates, re-encoding may not be performed when the code rate after the withdrawal is equal to or greater than the code rate before the withdrawal.

Here, the block data to be stored may correspond to multiple pieces of block group data.

Figure 2:
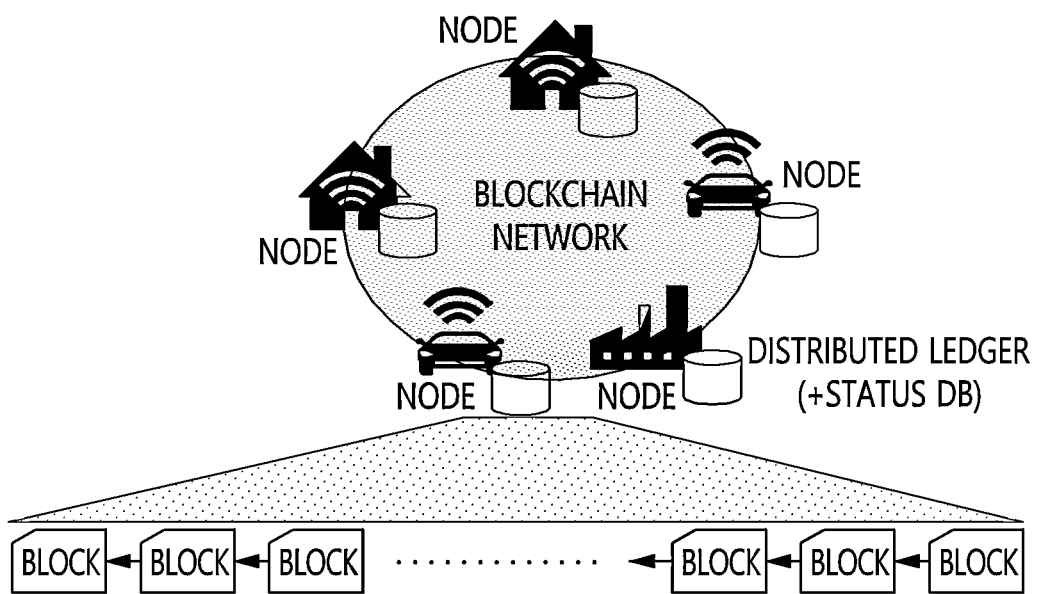
FIG. 2 illustrates an example of a blockchain system for performing the present disclosure.

FIG. 2 illustrates an example of a blockchain system for performing the present disclosure.

Referring to FIG. 2, various types of computing devices may participate, as nodes, in a blockchain network. The nodes participating in the blockchain network may be connected to various types of networks. These network types may include direct connection, Local Area Network (LAN), Wide Area Network (WAN), and wireless types. Each node participating in the blockchain network may be provided with storage space, and may store a distributed ledger (including block data, status data, and other types of data).

The nodes participating in the blockchain network may have various participation degrees within the blockchain network. From the standpoint of ledger storage, the blockchain network may be composed of nodes which do not store a ledger, nodes which store only some copies of the ledger, and full nodes which store complete copies. The nodes referred to as full nodes may generally be the nodes which store complete copies. Hereinafter, the detailed description of the present disclosure will be made based on the full nodes as an example of the present disclosure. However, the scope of the present disclosure is not limited thereto.

Figure 3:
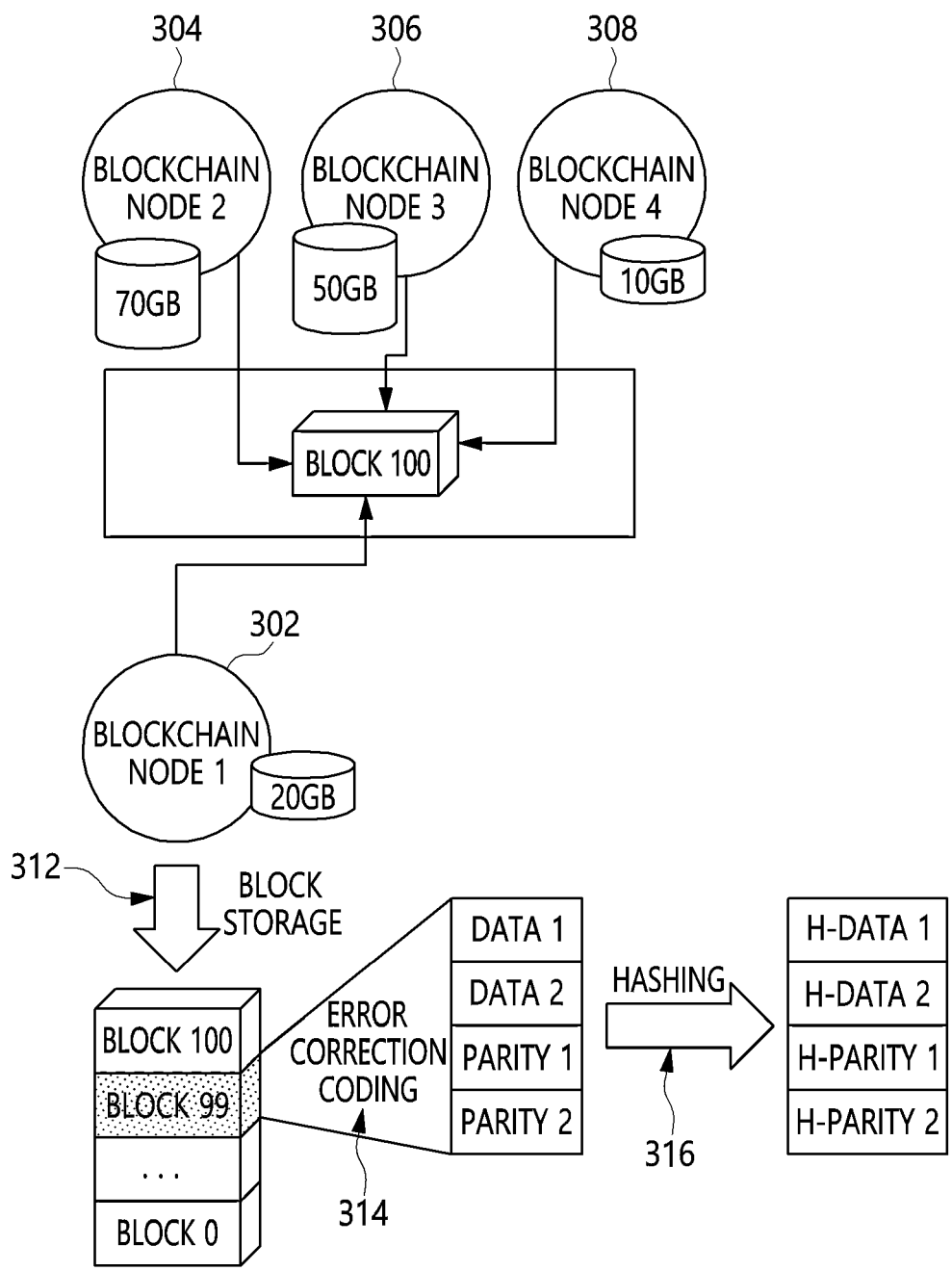
FIG. 3 conceptually illustrates a block encoding and hashing process according to an embodiment of the present disclosure.

FIG. 3 conceptually illustrates a block encoding and hashing process according to an embodiment of the present disclosure.

Hereinafter, as shown in FIG. 3, the embodiment of the present disclosure will be described on the assumption that a total of four blockchain nodes 302, 304, 306, and 308 participate in a blockchain network. Respective nodes may include storage spaces of different sizes. In an embodiment of the present disclosure, block 100 may be determined to be a new block after achieving a consensus in the blockchain network. When block 100 is determined to be the new block, respective nodes of the blockchain network may store (312) the corresponding block in their own ledgers. Below, in order to describe an encoding and hashing process, a detailed process will be described based on blockchain node 1 302.

In some embodiments, blockchain node 1 302 may identify one or more blocks having low access frequency. In an example, there is a strong possibility that a block that was generated a long time ago will be less frequently accessed to provide service of the blockchain network. A method for identifying a block having low access frequency may vary. When block(s) having low access frequency are identified, ECC (314) may be executed on the corresponding block(s). The maximum rate of errors or missing bits that can be recovered by ECC may be determined by the design of ECC. Therefore, suitable error correction codes (ECCs) may be selectively used depending on different conditions. An example of ECC may include erasure coding. Hereinafter, Reed-Solomon Code (RS-Code), which is one algorithm of erasure coding, will be described by way of example.

By utilizing ECC, each of the blockchain nodes may store part of the encoded block data, and may be provided with the remaining part of the encoded block data from other blockchain nodes when the corresponding block is required. This ECC may be executed only when the computing resource utilization rate of blockchain node 1 302 is less than or equal to a certain rate in some embodiments. Further, this ECC may be executed when the storage space utilization rate of blockchain node 1 302 is equal to or greater than a certain rate. After ECC execution, the storage space may be reduced by deleting some data In FIG. 3, blockchain node 1 302 may identify block 99 as a block having low access frequency, and may execute ECC (314). In an embodiment, by erasure coding, block 99 may be divided into two datasets Data1 and Data2 (k=2) depending on erasure coding, and two parity datasets Parity1 and Parity2 may be added (m=2) to the two datasets, whereby block 99 may be encoded into a total of four datasets. As will be described later, each of the four encoded datasets may be stored in any one of the blockchain nodes depending on a storage method.

Further, hashing is performed (316) on each of the four encoded datasets, and thus hash values H-Data1, H-Data2, H-Parity 1, and H-Parity2 may be respectively calculated. Each of the nodes stores hash values for the remaining datasets other than the encoded dataset stored therein. The stored hash values may be used to verify whether the encoded datasets provided from other nodes are authentic when the corresponding block is restored.

In an embodiment, when blockchain node 1 302 is designated to store the dataset Data1 depending on the storage method, the blockchain node 1 302 stores the hash values H-Data2, H-Parity1, and H-Parity2 for the remaining datasets, together with the first dataset Data1. The remaining dataset(s) Data2, Parity1, and Parity2 other than the selected dataset(s) and block 99 may be deleted to save the storage space.

In an embodiment, block 99 is divided into two datasets, and two parity datasets are added as two redundant bits. A method for determining the number of division of datasets and the number of redundant (parity) datasets to be added will be described in detail later with reference to Equations (1), (2), (3), and (4).

Figure 4:
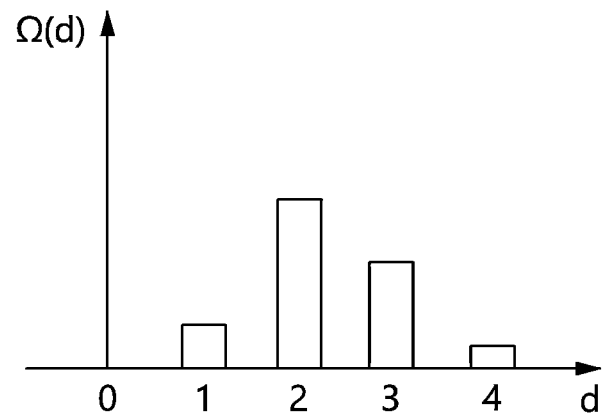
FIG. 4 illustrates an example of a dataset storage probability distribution diagram depending on storage spaces for respective blockchain nodes.

FIG. 4 illustrates an example of a dataset storage probability distribution diagram depending on storage spaces for respective blockchain nodes according to the example of FIG. 3.

Referring to FIG. 4, 1 on an x axis corresponds to blockchain node 1 302 having a storage space of 20 GB, 2 corresponds to blockchain node 2 304 having a storage space of 70 GB, 3 corresponds to blockchain node 3 306 having a storage space of 50 GB, and 4 corresponds to blockchain node 4 308 having a storage space of 10 GB.

In an embodiment of the present disclosure, blockchain node 1 302 may execute a probability distribution-based random integer generation function (first function) of randomly generating integers falling within a range of [1, 4 (the total number of blockchain nodes)] depending on the probability distribution of FIG. 4. When a random integer is generated through the first function, a block number or the hash value of the corresponding block may be used as a seed value so as to obtain the same sequence numbers from all nodes. The numbers in the sequence may be generated until all encoded datasets can be assigned to the blockchain nodes. In an embodiment, the corresponding integer sequence is assumed to be (3, 2, 1, 2, 3, 2, 4, . . . ).

Figure 5:
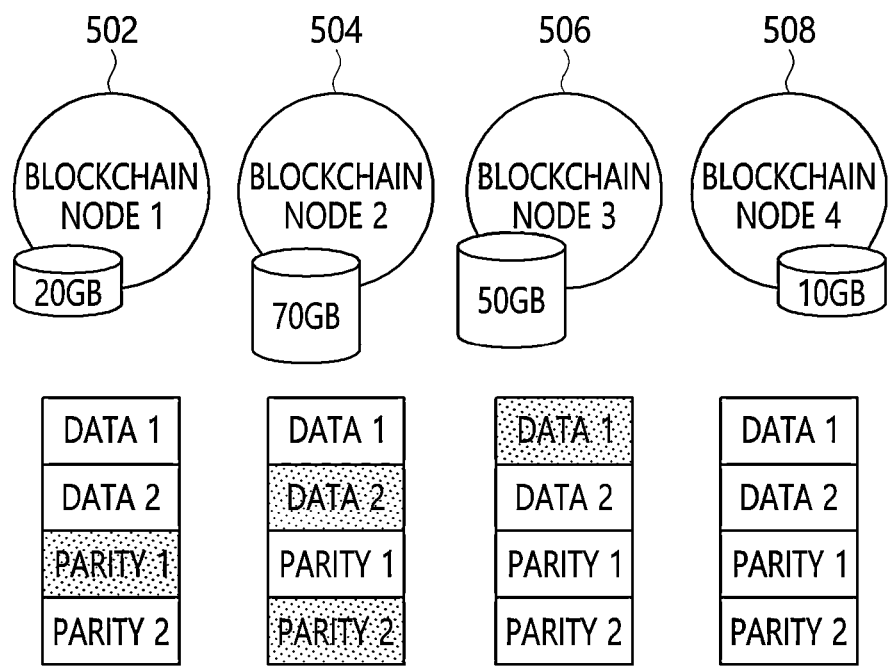
FIG. 5 illustrates an example of a method for storing encoded datasets according to an embodiment of the present disclosure.

FIG. 5 illustrates an example of a method for storing encoded datasets according to an embodiment of the present disclosure.

Referring to FIG. 5, encoded dataset Data1 is configured such that a first number in a sequence is 3, and thus the encoded dataset Data1 is stored in blockchain node 3 506 corresponding to node 3. With reference to a second number of 2 in the sequence, Data2 is stored in node 2 504, Parity1 is stored in node 1 502, and Parity2 is stored in node 2 504. When the encoded datasets are stored in this way, the pieces of encoded data may be stored in the blockchain nodes at the ratio of data amounts corresponding to the storage space ratio of individual nodes. Depending on the data storage method, blockchain node 1 502 stores Parity 1, generates hash values H-Data1, H-Data2, and H-Parity 2 corresponding to the remaining datasets, and stores the hash values together with Parity 1. Blockchain node 2 504 stores Data2 and Parity2, and generates and stores hash values H-Data1 and H-Parity1.

In an embodiment, blockchain node 2 504 stores two datasets among the encoded datasets. Meanwhile, the blockchain network needs to be able to solve a possible problem situation that may occur due to Byzantine nodes (erroneous or malicious nodes). Assuming that blockchain node 2 504 is a Byzantine node and stores three datasets, a situation that recovery is impossible may occur when other blockchain nodes access block 99. Therefore, in order to solve a Byzantine fault situation, the maximum number of datasets that can be stored in each blockchain node needs to be controlled to be less than or equal to a certain number. A method for determining the maximum number of datasets that can be stored in each blockchain node will be described in detail with reference to the following Equations (1) and (2).

Because the blockchain nodes share the ECC-encoded blocks, original block data may be recovered as long as a percentage of honest blockchain nodes or normal datasets is equal to or greater than the code rate of ECC when forged data is present or data loss occurs due to errors or the like. In one example of ECC, erasure code divides original data into k units, and adds m parity bits to the k units to generate (encode) n (=k+m) datasets. Among the n datasets, arbitrary k datasets are given, the original data may be recovered. That is, even though arbitrary m datasets among the n datasets are lost, recovery of the original data is possible.

A consensus method utilized in the blockchain network may include various types. The allowable number of Byzantine nodes also varies depending on the consensus method types.

Equation (1) shows the relationship between the total number of blockchain nodes n and the maximum allowable number of Byzantine nodes f for each consensus method. When the blockchain network has f+1 pieces of correct information, it may be normally operated even though there is any Byzantine node. In some embodiments, when a Byzantine node ratio is R=3 and the total number of blockchain nodes is 4 in the blockchain network which utilizes Practical Byzantine Fault Tolerance (PBFT), the maximum allowable number of Byzantine nodes is f=1. In this case, the total number of ECC-encoded datasets is equal to the total number of blockchain nodes, that is, 4. Assuming that f+1=2 datasets, among the encoded datasets, correspond to correct information, the original block data may be recovered. The Byzantine node ratio R may vary depending on the consensus method, wherein the Byzantine node ratio may correspond to 3 in the case of PBFT, may correspond to 4 in the case of for Zilliqa, and may correspond to 5 in the case of Ripple.

$$f = \left\lfloor \frac{n-1}{R} \right\rfloor = \text{int}\left(\frac{n-1}{R}\right) \qquad (1)$$

In Equation (1), R may denote a Byzantine node ratio, n may denote the total number of blockchain nodes, and f may denote the maximum allowable number of Byzantine nodes.

Equations (2), (3), and (4) show the number of parity datasets for determining a code rate in ECC encoding according to an embodiment of the present disclosure, the number of subblock datasets, and the number of datasets that can be stored per node, respectively.

Number of parity datasets$(m)=(R-1)*f$ (2)

Number of subblock datasets$(k)=n-m$ (3)

Number of datasets that can be stored per blockchain node$=R-1=m/f$ (4)

Referring to Equation (1), because the total number of blockchain nodes n corresponds to R*f+1, and the recovery of the original data is possible when f+1 pieces of correct information are given, the number of parity datasets m may be (R−1)*f. Accordingly, the number of subblock datasets k is a value obtained by subtracting the number of parity datasets m from the total number of datasets (the total number of blockchain nodes n).

Meanwhile, because a maximum of f Byzantine nodes may be present in the blockchain network, and m(=(R−1)*f) dataset errors may be tolerated, each Byzantine node can have a maximum of R−1 pieces of data.

Based on this, when the PBFT environment described in FIGS. 4 and 5 is taken into consideration, n=4, R=3, and f=1 may be obtained. Therefore, the number of parity datasets m may be 2, and thus two parity datasets Parity1 and Parity2 are present. Furthermore, the number of subblock datasets k may be 2, and thus the subblock datasets may be divided into Data1 and Data2. Furthermore, the maximum number of datasets that can be stored in each node may be 2.

In another embodiment, assuming that the probability distribution-based random integer sequence according to the description of FIG. 4 is (2, 3, 2, 2, 1, 2, 4, . . . ), the assignment of nodes which store datasets is provided as (Data1, node 2 504), (Data2, node 3 506), (Parity 1, node 2 504), and (Parity2, node 1 502). Although the dataset Parity2 is to be assigned to node 2 504 according to the sequence, node 2 504 already satisfies the maximum storable number 2, and thus assignment is changed to a next sequence integer. Because all nodes participating in the blockchain network may obtain the same random integer sequence for an encoding target block, and may know the maximum number of datasets that can be stored, they may identify the storage nodes of respective datasets.

In a further embodiment, when the code rate k/n of ECC encoding is determined, the code rate decreases as the number of parity datasets m increases (accordingly, the maximum number of datasets that can be stored per blockchain node also increases), with the result that the storage space efficiency may decrease. Therefore, in conformity with the situation of the blockchain network according to an embodiment, the number of parity datasets (and the maximum number of datasets that can be stored per blockchain node) may be determined. The number of parity datasets m may be determined within a range of $2*f <= m <= (R-1)*f$ (where m is an integer multiple of f). Therefore, the maximum number of datasets that can be stored per blockchain node may be equal to or greater than 2 and less than or equal to (R−1). Although the number of datasets that can be stored per blockchain node may be 1, the same situation as a situation in which storage space per blockchain node is not considered occurs when the number of datasets that can be stored per blockchain node is 1, and thus this case is excluded from consideration.

In an example, assuming that the Byzantine node ratio R is 5 and the number of blockchain nodes is n=10, f=1 is obtained. Therefore, the range of m and the maximum number of datasets that can be stored per blockchain node is a range of [2, 3, 4]. In an embodiment, a suitable number falling within the range of [2, 4] may be selected.

Figure 6:
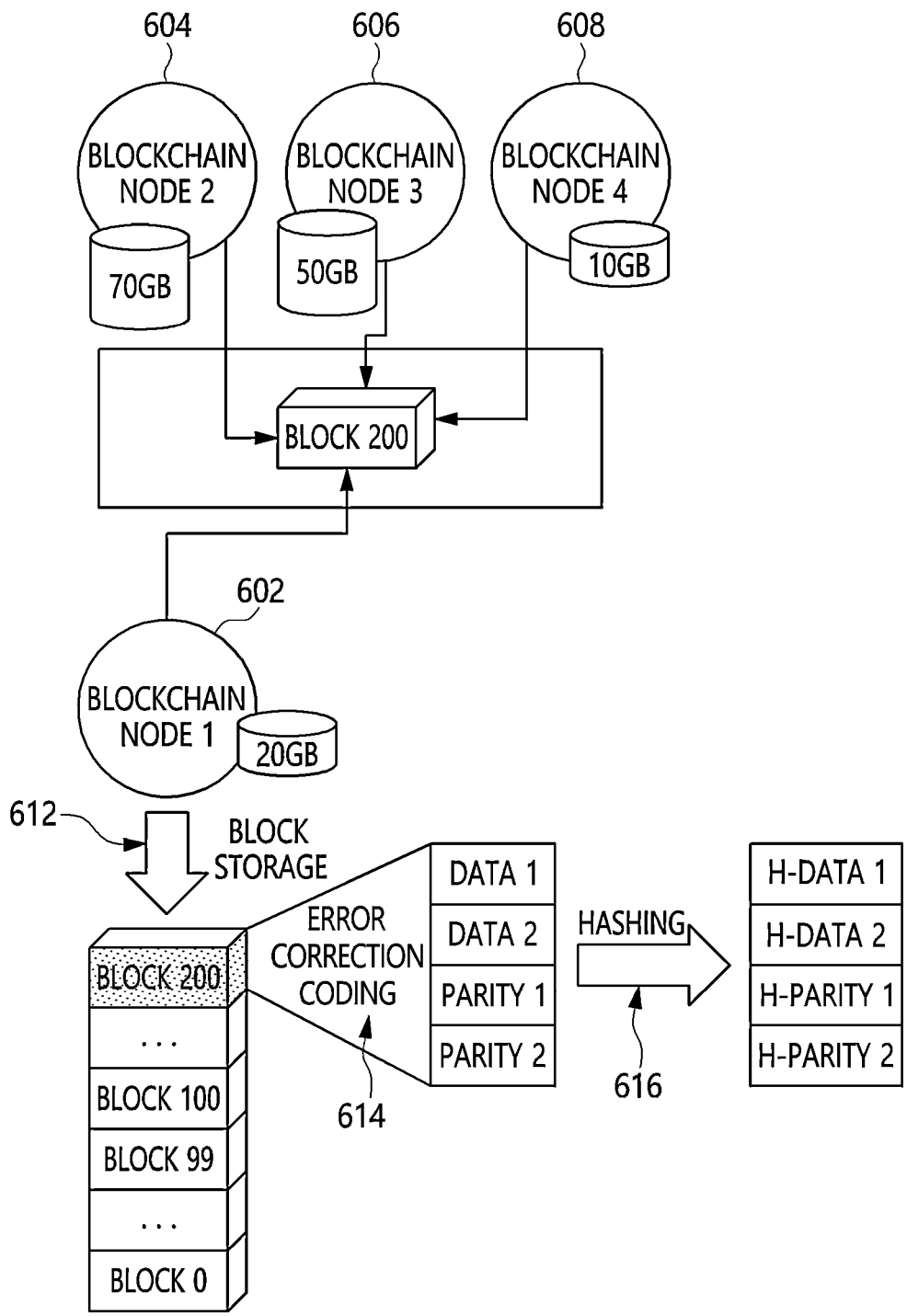
FIG. 6 illustrates another example of a method for storing encoded datasets according to an embodiment of the present disclosure.

FIG. 6 illustrates another example of a method for storing encoded datasets according to an embodiment of the present disclosure.

Referring to FIG. 6, it can be seen that four blockchain nodes 602, 604, 606, and 608 participate in a blockchain network. Hereinafter, an encoding and hashing process according to another embodiment will be described based on the blockchain node 602. When new block data is determined through a consensus process in the blockchain network and is added to the blockchain (612), the blockchain node 602 may encode the block data by performing ECC 614. Unlike FIG. 3, the blockchain node 602 performs ECC on block data when the block data is added to the blockchain. By means of this process, the blockchain nodes only a selected portion of the encoded dataset and hash values of the remaining datasets depending on the data storage method, without needing to store all blocks, thus further saving storage space.

Similar to the example of FIG. 3, the blockchain node 602 may select dataset(s) to be stored in the blockchain node 602 depending on the data storage method after ECC is performed. Hash values may be calculated for the remaining dataset(s) other than the dataset(s) to be stored. Further, the selected dataset(s) and the calculated hash values may be stored. The remaining dataset(s), other than the selected dataset(s), and the block data may be deleted.

When data of block 200 is required, the blockchain nodes may be provided with the datasets stored in the blockchain nodes 602, 604, 606, and 608 therefrom depending on the data storage method. Hashing is performed on each of the provided dataset(s), and the result of hashing is compared with hash value(s) stored in the corresponding blockchain node as to whether the result of the hashing matches the stored hash value(s). When the result of the hashing matches the stored hash value(s), the data is recognized as the correct data. When the number of datasets recognized as the correct data is equal to or greater than k, original block data may be decoded from the datasets.

Figures 7, 8:
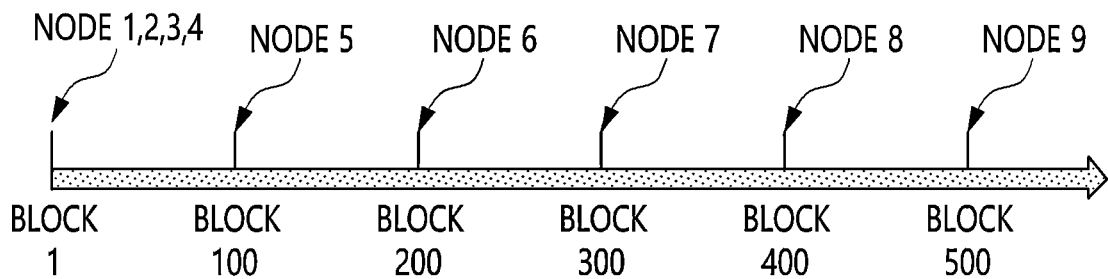
FIG. 7 illustrates an example of a situation in which new blockchain nodes are added to a blockchain network and blocks are generated.
FIG. 8 illustrates an example of an index data structure according to an embodiment of the present disclosure.

FIG. 7 illustrates an example of a situation in which new blockchain nodes are added to a blockchain network and blocks are generated.

Referring to FIG. 7, when block 1 to block 100 are generated, four blockchain nodes 1, 2, 3, and 4 are present in a blockchain network. Assuming a PBFT consensus, the maximum allowable number of Byzantine nodes f is 1. Referring to Equations (1), (2), (3), and (4), when the number of blockchain nodes is 4, the number of parity datasets m for ECC encoding is m=2, and the number of subblock datasets k is k=2. The encoded blocks are distributed and stored in four blockchain nodes, respectively depending on the storage method, described above with reference to FIGS. 4 and 5.

Referring to FIG. 7, while block 101, is generated, blockchain node 5 is added to the blockchain network. Here, blockchain node 5 may store copies of the blocks ranging from block 1 to block 100. When the storage space of node 5 is insufficient to make it impossible to store copies of blocks ranging from 1 to block 100, node 5 may start a re-encoding process based on a re-encoding process, which will be described later. When a consensus on re-encoding fails, the addition of node 5 may be rejected. For blocks ranging from block 101 to block 200, a total of five nodes are present in the blockchain network, wherein the maximum allowable number of Byzantine nodes f=1, the number of parity datasets m=2, and the number of subblock datasets k=3 are obtained. Therefore, each of the blocks is divided into three datasets and is divided into a total of five datasets through encoding, and thus the five datasets may be distributed and stored in the five blockchain nodes depending on the storage method.

When blockchain node 6 is added to the blockchain network while block 201 is generated, blockchain node 6 may store copies of blocks ranging from block 1 to block 200. When the storage space of node 6 is insufficient, re-encoding may be requested similarly to the case where node 5 is added. For blocks ranging from block 201 to block 300, a total of six nodes are present in the blockchain network, wherein the maximum allowable number of Byzantine nodes f=1, the number of parity datasets m=2, and the number of subblock datasets k=4 are obtained. Therefore, each of the blocks is divided into four datasets and is divided into a total of six datasets through encoding, and thus the six datasets may be distributed and stored in the six blockchain nodes depending on the storage method.

When blockchain node 7 is added to the blockchain network while block 301 is generated, blockchain node 7 may store copies of blocks ranging from block 1 to block 300. When the storage space of node 7 is insufficient, re-encoding may be requested similarly to the case where nodes 5 and 6 are added. For blocks ranging from block 301 to block 400, a total of seven nodes are present in the blockchain network, wherein the maximum allowable number of Byzantine nodes f=2, the number of parity datasets m=4, and the number of subblock datasets k=3 are obtained. Therefore, each of the blocks is divided into three datasets and is divided into a total of seven datasets through encoding, and thus the seven datasets may be distributed and stored in the seven blockchain nodes depending on the storage method.

When blockchain node 8 is added to the blockchain network while block 401 is generated, blockchain node 8 may store copies of blocks ranging from block 1 to block 400. When the storage space of node 8 is insufficient, re-encoding may be requested similarly to the case where nodes 5, 6, and 7 are added. For blocks ranging from block 401 to block 500, a total of eight nodes are present in the blockchain network, wherein the maximum allowable number of Byzantine nodes f=2, the number of parity datasets m=4, and the number of subblock datasets k=4 are obtained. Therefore, each of the blocks is divided into four datasets and is divided into a total of eight datasets through encoding, and thus the eight datasets may be distributed and stored in the eight blockchain nodes depending on the storage method.

When blockchain node 9 is added to the blockchain network while block 501 is generated, blockchain node 9 may store copies of blocks ranging from block 1 to block 500. When the storage space of node 9 is insufficient, re-encoding may be requested similarly to the case where nodes 5, 6, 7, and 8 are added. For blocks ranging from block 501, a total of nine nodes are present in the blockchain network, wherein the maximum allowable number of Byzantine nodes f=2, the number of parity datasets m=4, and the number of subblock datasets k=5 are obtained. Therefore, each of the blocks is divided into five datasets and is divided into a total of nine datasets through encoding, and thus the nine datasets may be distributed and stored in the nine blockchain nodes depending on the storage method.

Meanwhile, referring to description of FIG. 7, when a new node is added to the blockchain network, a block encoding method may be changed. For example, in the case of block 100, the number of parity datasets m=2 and the number of subblock datasets k=2 may be obtained, whereas, in the case of block 101, the number of parity datasets m=2 and the number of subblock datasets k=3 may be obtained. Changes in this encoding method need to be identified by the blockchain network so as to enable decoding on specific block data when the specific block data is accessed in the future.

FIG. 8 illustrates an example of an index data structure according to an embodiment of the present disclosure.

Referring to FIG. 8, each of blocks ranging from block 101 to block 200 has a total of five nodes, which are listed in the order of (Node1, Node2, Node3, Node4, Node5). Further, the value of k, which is a number to divide block data for ECC encoding, may be 3, whereby each piece of block data is divided into three datasets. The number of parity datasets m to be generated through encoding is 2, whereby two parity datasets are generated. Five respective datasets having been encoded may be distributed and stored in five nodes depending on the storage method described above with reference to FIGS. 4 and 5.

The index data structure of FIG. 8, which is a type of information different from that of block data, may be stored in a blockchain ledger, and may be shared in the blockchain network.

Hereinafter, a re-encoding process according to an embodiment of the present disclosure will be described in detail.

When blockchain nodes in a blockchain network reach a consensus on re-execution of ECC encoding on blocks ranging from block 1 to block 500 so as to improve storage space efficiency, ECC encoding may be re-executed in consideration of all of nine blockchain nodes. Re-execution of ECC encoding may be initiated in such a way that, when an arbitrary node among blockchain nodes participating in the blockchain network has its own storage space utilization rate exceeding a certain rate, the corresponding node requests a consensus on re-encoding from other blockchain nodes. Alternatively, in the case where any trusted node, other than the blockchain nodes which participate as full nodes in the blockchain network, is present in the blockchain network, ECC re-encoding may be initiated when the trusted node determines that the redundancy rate in the blockchain network is greater than a specific threshold value.

In an embodiment, such re-encoding may be initiated based on the block-wise redundancy rate when a specific block is selectively encoded, as described above with reference to FIG. 3.

In another embodiment, when continuous block encoding occurs, as described above with reference to FIG. 6, such re-encoding may be performed in a block section simultaneously including multiple blocks.

The re-encoding process is performed in such a way as to first perform a block data recovery procedure on each of re-encoding target blocks and then refer to the number of parity datasets and the number of subblock datasets depending on the method, described above with reference to Equations (1), (2), (3) and (4), through the total number of blockchain nodes in the blockchain network. After encoding is completed, the datasets are stored through the storage method described above with reference to FIGS. 4 and 5. Here, an index data structure may also be modified.

Figure 9:
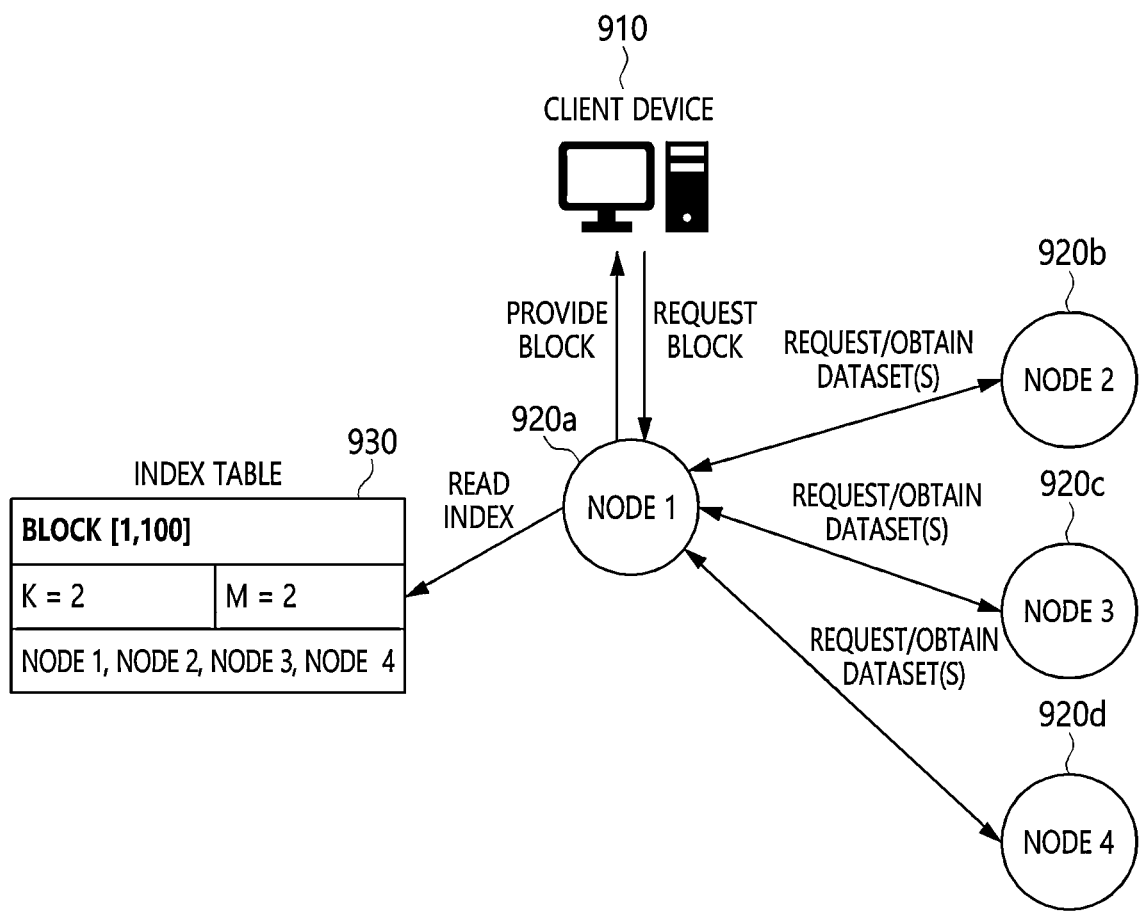
FIG. 9 illustrates a block access and recovery process according to an embodiment of the present disclosure.

FIG. 9 illustrates a block access and recovery process according to an embodiment of the present disclosure.

Referring to FIG. 9, when a client device 910 requires block 99 to make a smart contract or the like, the client device 910 may send a request for block 99 to a blockchain node (e.g., node 1 920*a*) so as to retrieve block data from a blockchain. Node 1 having received the corresponding request may read an index data structure 930 for the corresponding block data. By recognizing the ECC encoding method for the corresponding block 99 through index reading and executing a probability distribution-based random integer generation function (first function) based on the method described above with reference to FIGS. 4 and 5, a node number sequence is obtained. By means of this process, the locations of a total of four (n=k+m) dataset storage nodes are detected.

Referring to the situation described with reference to FIG. 5, Data1 may be obtained through node 3, Data2 and Parity2 may be obtained through node 2, and Parity1 may be obtained from node 1 itself. Thereafter, node 1 generates hash values for the datasets obtained from other nodes (e.g., node 2 and node 3) and compares the generated hash values with the hash values stored in node 1 to determine whether the obtained datasets are correct datasets. When it is determined that the hash values do not match each other, node 1 may determine the node which provides the corresponding dataset to be a defective node. Among the obtained datasets Data1, Data2, and Parity2, datasets verified to be correct and the dataset Parity1 stored in node 1 itself may be decoded together to recover block 99. The recovered block 99 may be provided to the client.

Hereinafter, in an embodiment of the present disclosure, in order to describe an ECC encoding method for reducing a system load by decreasing re-encoding possibility, the relationship between the allowable number of Byzantine nodes and the total number of nodes is illustrated. That is, for the same maximum allowable number of Byzantine nodes f, the range n of the number of blockchain nodes may be represented as follows.

$$R*f+1 \leq n \leq R*(f+1)$$ (5)

Therefore, the maximum number N for the number of blockchain nodes n for the same number of Byzantine nodes f may be represented as follows.

$$N=R*(f+1)$$ (5)

Depending on the number of blockchain nodes n participating in the blockchain network, the maximum allowable number of Byzantine nodes f may be determined. In contrast, depending on the same maximum allowable number of Byzantine nodes f, the total number of blockchain nodes may have a value falling within a specific range.

In this way, when the number of Byzantine nodes f is determined, the range of the total number of blockchain nodes obtained for the same value f is equal to or greater than a value, obtained by multiplying f by the Byzantine node ratio R corresponding to the consensus method and adding 1 to the multiplied result, and is less than or equal to a value, obtained by multiplying the Byzantine node ratio R by f+1. Therefore, when the number k to divide the block data for ECC encoding is set to, instead of n−m, N−m by exploiting the maximum value N=R*(f+1) within the range of values which n can have, re-encoding may be unnecessary even though a node is added in the future.

Therefore, during ECC encoding, when ECC encoding is performed using the maximum value N within the range of n after the value of f is determined, re-encoding may be eliminated. Referring to the example of FIG. 5, the total number of current blockchain nodes n is 4 and the maximum allowable number of Byzantine nodes f is 1. Therefore, n ranges from a value equal to or greater than 4 to a value less than or equal to 6. Therefore, ECC encoding is performed using (k=4, m=2) instead of (k=2, m=2). In this situation, even though node 5 is added, an allowable code rate is achieved without changing ECC encoding. Even though node 6 is added, an allowable code rate is also achieved without changing ECC encoding.

In this way, when a node is added without changing the ECC encoding method, the added node is included and the result of the probability distribution-based random integer generation function (first function) changes, and thus relocation of datasets between blockchain nodes is performed so as to reflect the change of the sequence result. Relocation cost may be lower than re-encoding cost (the sum of recovery cost and encoding cost).

Figure 10:
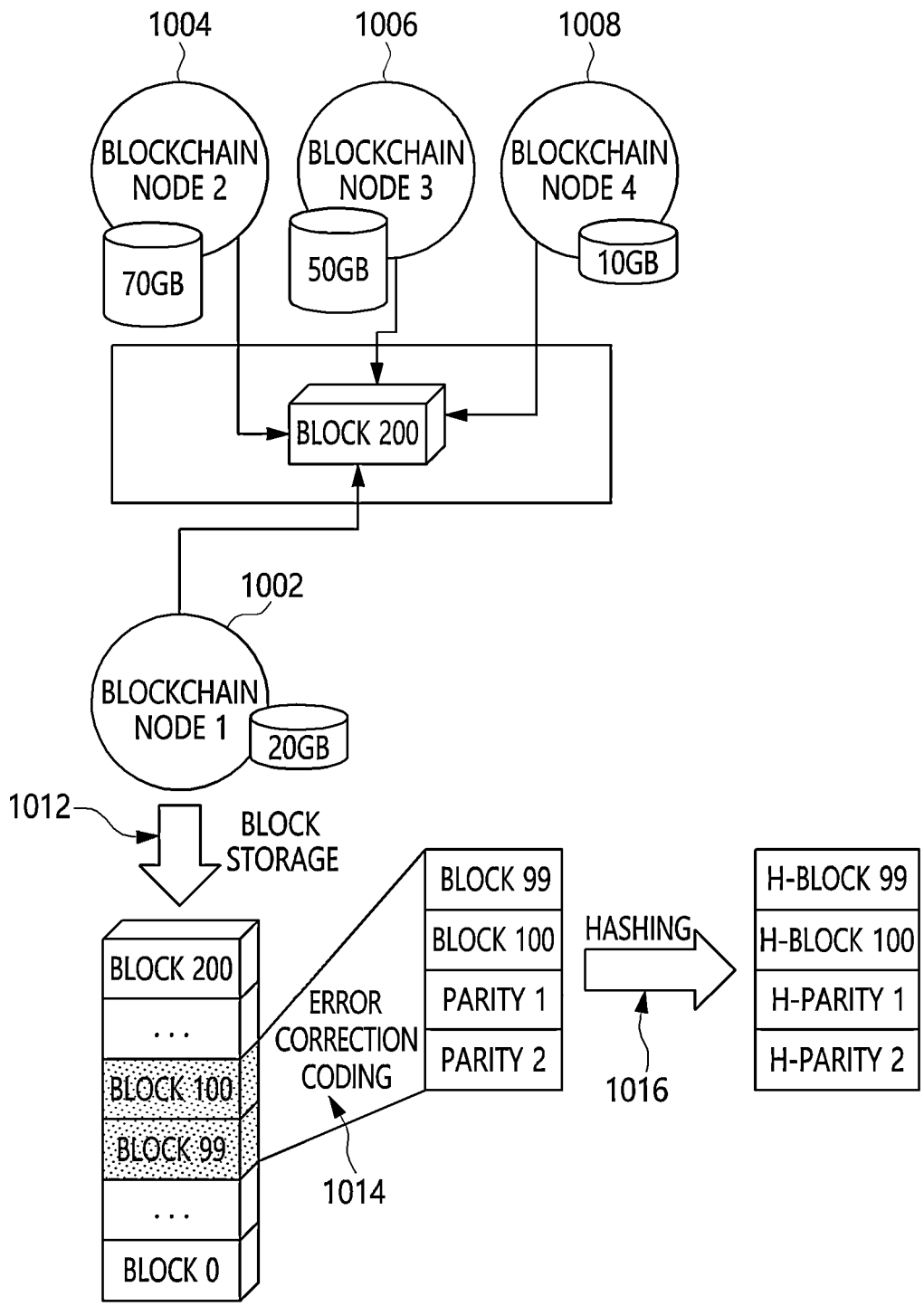
FIG. 10 illustrates a block group data encoding and hashing process according to an embodiment of the present disclosure.

FIG. 10 illustrates a block group data encoding and hashing process according to an embodiment of the present disclosure.

Referring to FIG. 10, a total of four blockchain nodes 1002, 1004, 1006, and 1008 participate in a blockchain network.

Referring to FIG. 10, a blockchain node 1002 may perform ECC encoding, division, and hashing on a block group composed of pieces of block data, instead of performing ECC encoding, division, and hashing on each block, as illustrated in FIG. 3. According to Equations (1), (2), (3), and (4), when the number of blockchain nodes is 4, the number of parity datasets m is determined to be 2 and the number of datasets k divided from block data is determined to be 2.

Depending on the determined k value, the number of blocks in the block group described in the present example is determined to be k. That is, referring to Equations (1), (2), (3), and (4), k is 2, whereby two blocks form the block group. In FIG. 10, an ECC encoding process 1014 on block 99 and block 100 is described. Block 99 and block 100 are used as original block data, and are divided into two datasets. Respective pieces of block data in the blockchain network may have different sizes. On the other hand, because the sizes of divided datasets need to be equal to each other so as to perform ECC encoding, the sizes of respective blocks are adjusted to the size of the block having the largest size within the block group. For this, in order to obtain a desired size, a space after the block data is padded with values of 0. In the case of a systematic code such as erasure code, the divided datasets are block 99 and block 100 which are the same as the original data.

Thereafter, two parity blocks are generated through ECC encoding. The four generated datasets are distributed and stored in blockchain nodes through the storage method, described above with reference to FIGS. 4 and 5. Further, hashing is performed (1016) on each of the four encoded datasets, and thus hash values H-block 99, H-block 100, H-Parity1, and H-Parity2 may be calculated. Each of the nodes stores hash values for the remaining datasets other than the encoded dataset stored therein. The hash values are used to verify whether the encoded datasets provided from other nodes are authentic when the corresponding block is restored in the future.

In an embodiment, when the blockchain node 1002 is designated to store block 99 depending on the storage method, the blockchain node 1002 stores the hash values H-block 100, H-Parity 1, and H-Parity2 for the remaining datasets, together with block 99. The remaining dataset(s), other than the selected dataset(s), may be deleted to save storage space.

As described above with reference to FIG. 10, when ECC encoding is applied to a block group instead of individual blocks, the original blocks (e.g., block 99 and block 100) among the encoded datasets are provided as the datasets, and there is an advantage in that the corresponding block may be recovered without requiring a decoding process. An operator of the blockchain network may selectively utilize a block-wise encoding method and a block group-wise encoding method in conformity with the operating situation of the blockchain network.

Figure 11:
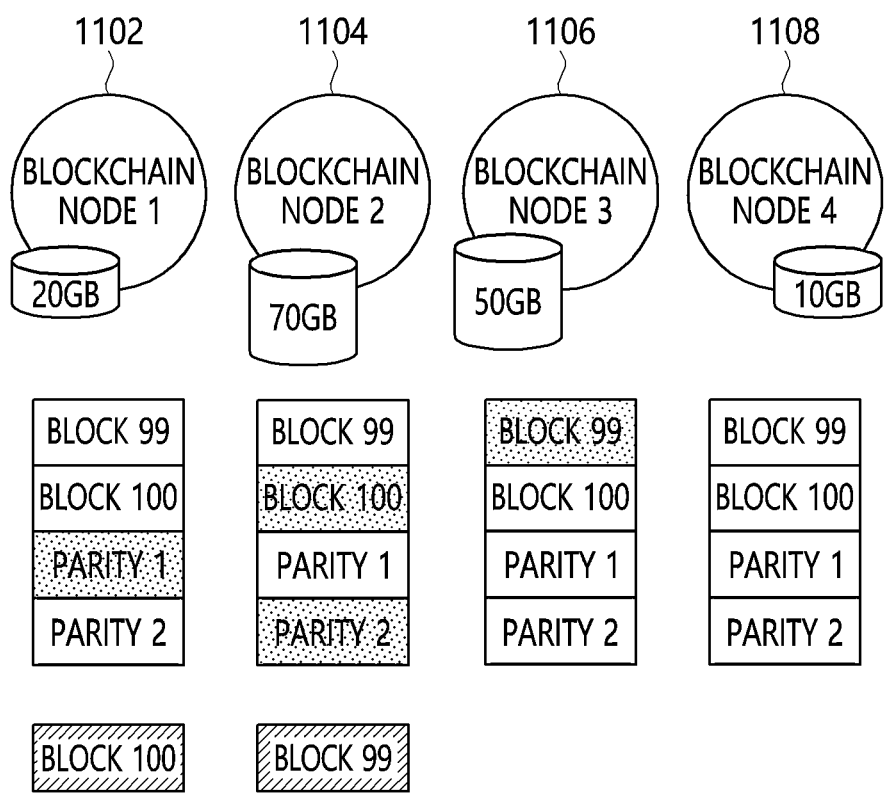
FIG. 11 illustrates an example of a process of storing additional block data besides ECC-encoded datasets in some blockchain nodes.

FIG. 11 illustrates an example of a process of storing additional block data besides ECC-encoded datasets in some blockchain nodes.

In some embodiments, in order to improve a possibility to access block data without requiring a decoding process, original block data may be selectively and additionally stored in blockchain network nodes in addition to the distributed store of the encoded datasets. Referring to FIG. 5 or 10, among the encoded datasets, a first dataset (e.g., Data1 or block 99) is stored in node 3 (e.g., 506 or 1006), and a second dataset (e.g., Data2 or block 100) is stored in node 2 (e.g., 504 or 1004). A third dataset Parity 1 is stored in node 1 (e.g., 502 or 1002) and a fourth dataset Parity2 is stored in node 2.

Separately from this process, in order to extend an opportunity to access encoding target block data (e.g., block 99 or block 100) without requiring decoding, the block data itself may be additionally stored in one or more of the blockchain nodes. Hereinafter, the storage method will be described in detail with reference to FIG. 11. In the present embodiment, for better understanding of the disclosure, the case where one copy of original block data is stored will be described by way of example. However, the number of additional block copies to be stored may be selectively applied. For this, for block 99, a random integer is generated within a range of [1, the total number of blockchain nodes] by utilizing a second function similar to the probability distribution-based random integer generation function described above with reference to FIGS. 4 and 5. Hereinafter, it is assumed that the sequence of random integers generated for block 99 is (3, 2, 2, 1, 4, . . . ).

Here, as a candidate for the location at which the additional copy of block 99 is to be stored, node 3 is selected. However, because node 3 stores a portion corresponding to block 99 among the encoded datasets, it is duplicated and is excluded from candidates. A next sequence number is 2. Because node 2 does not store block 99 among the encoded datasets, node 2 becomes the target in which the copy of block 99 is to be stored. Therefore, as indicated by hatched lines in FIG. 11, the copy of block 99 is stored in node 2. Similarly, assuming that the second function is applied to block 100 and a random integer sequence is (1, 2, 3, 2, 4, . . . ), a first candidate is node 1, and node 1 does not store block 100 among the encoded datasets, and thus node 1 becomes the node in which the copy of block 100 is to be additionally stored.

If the number of copies of the block to be additionally stored is 2, processing may be performed using a second function and a third function.

In some embodiments, when a blockchain node withdraws from the blockchain network or is deleted from the blockchain network, a blockchain node having recognized such withdrawal/deletion may re-perform ECC encoding through a consensus in the blockchain network. If ECC-encoding is performed based on N described above in Equation (5), ECC-encoding does not need to be re-executed as long as the number of blockchain nodes n falls within a range of [$R*f+1$, $R*(f+1)$]. When the number of blockchain nodes falls out of the range or when an ECC encoding method is performed in consideration of the total number of nodes n, re-execution of ECC encoding needs to be taken into consideration.

Referring to FIG. 8, the code rate $k/(k+m)$ of encoding for a specific block may be known through the index data structure. Based on the total number of nodes n' after withdrawal of a specific node and the maximum allowable number of Byzantine nodes f', the code rate $(n'-(R-1)*f)/n'$ after withdrawal may be obtained. When the code rate after withdrawal is equal to or greater than the encoding code rate, re-execution of ECC encoding is not needed. When the code rate after withdrawal is less than the encoding code rate, ECC encoding is re-executed, thus responding to the withdrawal of the corresponding node.

Figure 12:
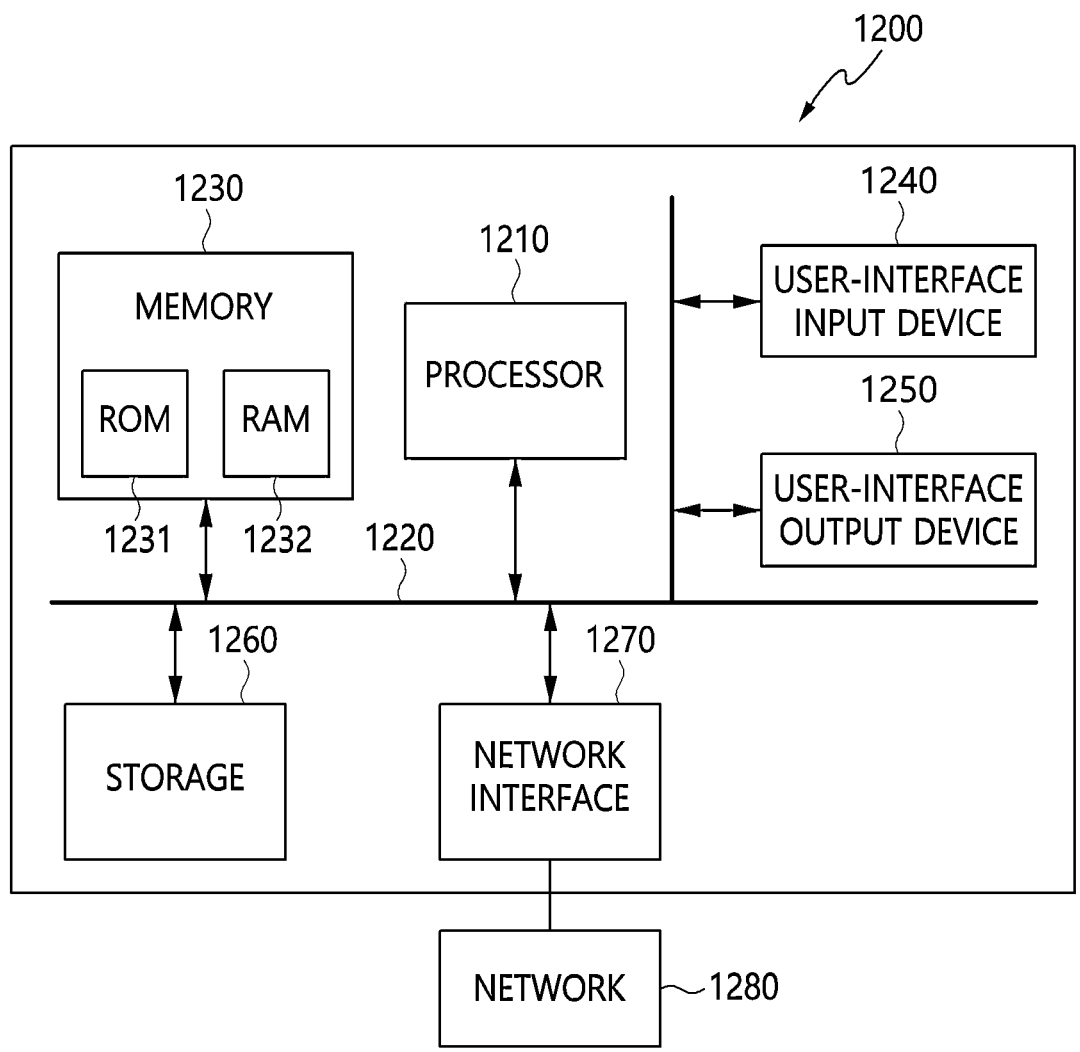
FIG. 12 is a diagram illustrating the configuration of a computer system according to an embodiment.

FIG. 12 is a diagram illustrating the configuration of a computer system according to an embodiment.

An apparatus for storing blockchain data based on error correction code according to an embodiment may be implemented in a computer system 1200 such as a computer-readable storage medium.

The computer system 1200 may include one or more processors 1210, memory 1230, a user interface input device 1240, a user interface output device 1250, and storage 1260, which communicate with each other through a bus 1220. The computer system 1200 may further include a network interface 1270 connected to a network 1280. Each processor 1210 may be a Central Processing Unit (CPU) or a semiconductor device for executing programs or processing instructions stored in the memory 1230 or the storage 1260. Each of the memory 1230 and the storage 1260 may be a storage medium including at least one of a volatile medium, a nonvolatile medium, a removable medium, a non-removable medium, a communication medium or an information delivery medium or a combination thereof. For example, the memory 1230 may include Read-Only Memory (ROM) 1231 or Random Access Memory (RAM) 1232.

An apparatus for storing blockchain data based on error correction code according to an embodiment may include one or more processors 1210 and execution memory 1230 configured to store at least one program that is executed by the one or more processors, wherein the at least one program include instructions for performing the step of dividing block data to be stored into multiple subblock datasets, the step of generating parity datasets corresponding to the block data, and the step of storing the subblock datasets and the parity datasets in proportion to storage capacities of the blockchain data storage nodes.

Here, the step of storing the subblock datasets and the parity datasets in proportion to the storage capacities of the blockchain data storage nodes may store hash values corresponding to the subblock datasets or the parity datasets in other blockchain data storage nodes in which the subblock datasets or the parity datasets are not stored.

Here, the blockchain data storage nodes may have a maximum number of datasets at which the subblock datasets and the parity datasets can be stored.

Here, the maximum number of datasets may be determined based on the ratio of allowable Byzantine nodes to normal nodes.

Here, the number of parity datasets may be determined based on the allowable number of Byzantine nodes and the ratio of allowable Byzantine nodes to the normal nodes.

Further, the number of parity datasets may be determined based on the maximum number of datasets and the allowable number of Byzantine nodes.

Here, when a new blockchain data storage node is added, the program may further include an instruction for performing the step of re-encoding existing blockchain data and storing re-encoded blockchain data in the new blockchain data storage node.

Here, the re-encoding and storing step may include the step of adjusting the number of parity datasets and the number of subblock datasets in conformity with the changed number of blockchain data storage nodes.

Here, the re-encoding and storing step may include the step of relocating the parity datasets and the subblock datasets when a new blockchain data storage node is added and there is no need to adjust the number of parity datasets and the number of subblock datasets.

Here, the program may further include an instruction for performing the step of storing the adjusted number of parity datasets and the adjusted number of subblock datasets in a preset data structure.

Here, the step of storing the subblock datasets and the parity datasets in proportion to the storage capacities may be performed using a probability distribution-based random integer generation function that is generated to correspond to the storage capacities of the blockchain data storage nodes.

Here, the sum of the number of subblock datasets and the number of parity datasets may correspond to $R*(f+1)$, where R may denote the ratio of allowable Byzantine nodes to the normal nodes, and f may be the allowable number of Byzantine nodes.

Here, the program may further include an instruction for performing the step of, when a blockchain data storage node withdraws from the blockchain network, comparing a code rate after the withdrawal of the corresponding blockchain data storage node with a code rate before the withdrawal of the corresponding blockchain data storage node.

Here, at the step of comparing the code rates, re-encoding may not be performed when the code rate after the withdrawal is equal to or greater than the code rate before the withdrawal.

Here, the block data to be stored may correspond to multiple pieces of block group data.

Specific executions described in the present disclosure are embodiments, and the scope of the present disclosure is not limited to specific methods. For simplicity of the specification, descriptions of conventional electronic components, control systems, software, and other functional aspects of the systems may be omitted. As examples of connections of lines or connecting elements between the components illustrated in the drawings, functional connections and/or circuit connections are exemplified, and in actual devices, those connections may be replaced with other connections, or may be represented by additional functional connections, physical connections or circuit connections. Furthermore, unless definitely defined using the term "essential", "significantly" or the like, the corresponding component may not be an essential component required in order to apply the present disclosure.

According to the present disclosure, there can be provided a distributed storage method in which the storage spaces of blockchain participant nodes are taken into consideration.

Further, the present disclosure may guarantee Byzantine fault tolerance and reduce storage spaces by storing blockchain data based on error correction coding.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A method for storing blockchain data based on error correction code, the method being performed by multiple blockchain data storage nodes, the method comprising:
   dividing block data to be stored into multiple subblock datasets;
   generating parity datasets corresponding to the block data; and
   storing the subblock datasets and the parity datasets based on storage capacities of the blockchain data storage nodes,
   wherein the storing the subblock datasets and the parity datasets is performed by using a probability distribution-based random integer generation function that is generated corresponding to the storage capacities of the blockchain data storage nodes.

2. The method of claim 1, wherein storing the subblock datasets and the parity datasets based on the storage capacities comprises:
   storing hash values corresponding to the subblock datasets or the parity datasets in an additional blockchain data storage node in which the subblock datasets or the parity datasets are not stored.

3. The method of claim 1, wherein each of the blockchain data storage nodes has a maximum number of datasets at which the subblock datasets and the parity datasets are capable of being stored.

4. The method of claim 3, wherein the maximum number of datasets is determined based on a ratio of allowable Byzantine nodes to normal nodes.

5. The method of claim 1, wherein a number of parity datasets is determined based on an allowable number of Byzantine nodes and a ratio of allowable Byzantine nodes to normal nodes.

6. The method of claim 1, further comprising:
   when a new blockchain data storage node is added, re-encoding existing blockchain data and storing re-encoded blockchain data in the new blockchain data storage node.

7. The method of claim 6, wherein re-encoding and storing comprises:
   adjusting a number of parity datasets and a number of subblock datasets in conformity with a changed number of blockchain data storage nodes.

8. The method of claim 7, wherein re-encoding and storing further comprises:
   relocating the parity datasets and the subblock datasets when a new blockchain data storage node is added and adjustment of the number of parity datasets and the number of subblock datasets is not required.

9. The method of claim 8, further comprising:
   storing the adjusted number of parity datasets and the adjusted number of subblock datasets in a preset data structure.

10. The method of claim 1, wherein a sum of a number of subblock datasets and a number of parity datasets corresponds to $R*(f+1)$, where R denotes a ratio of allowable Byzantine nodes to normal nodes, and f denotes a number of allowable Byzantine nodes.

11. The method of claim 1, further comprising:
    when a certain blockchain data storage node withdraws, comparing a code rate after withdrawal of the certain blockchain data storage node with a code rate before withdrawal of the certain blockchain data storage node.

12. The method of claim 11, wherein comparing the code rate comprises:
    not performing re-encoding when the code rate after the withdrawal is equal to or greater than the code rate before the withdrawal.

13. The method of claim 1, wherein the block data to be stored corresponds to multiple pieces of block group data.

14. An apparatus for storing blockchain data based on error correction code, comprising:
    one or more processors; and
    an execution memory configured to store at least one program that is executed by the one or more processors,
    wherein the at least one program comprises instructions for performing:
    dividing block data to be stored into multiple subblock datasets;
    generating parity datasets corresponding to the block data; and
    storing the subblock datasets and the parity datasets based on storage capacities of the blockchain data storage nodes,
    wherein the storing the subblock datasets and the parity datasets is performed by using a probability distribution-based random integer generation function that is generated corresponding to the storage capacities of the blockchain data storage nodes.

15. The apparatus of claim 14, wherein storing the subblock datasets and the parity datasets based on the storage capacities comprises:
    storing hash values corresponding to the subblock datasets or the parity datasets in an additional blockchain data storage node in which the subblock datasets or the parity datasets are not stored.

16. The apparatus of claim 14, wherein each of the blockchain data storage nodes has a maximum number of datasets at which the subblock datasets and the parity datasets are capable of being stored.

17. The apparatus of claim 16, wherein the maximum number of datasets is determined based on a ratio of allowable Byzantine nodes to normal nodes.

18. The apparatus of claim 14, wherein a number of parity datasets is determined based on an allowable number of Byzantine nodes and a ratio of allowable Byzantine nodes to normal nodes.

19. The apparatus of claim 14, wherein, when a new blockchain data storage node is added, the program further comprises an instruction for performing:
- re-encoding existing blockchain data and storing re-encoded blockchain data in the new blockchain data storage node.

* * * * *